US011275640B2

(12) United States Patent
Oliveri et al.

(10) Patent No.: US 11,275,640 B2
(45) Date of Patent: Mar. 15, 2022

(54) COMPUTER ERROR PREVENTION AND REDUCTION

(71) Applicant: KYNDRYL, INC., New York, NY (US)

(72) Inventors: Facundo Miguel Oliveri, Indaiatuba (BR); Tiago Dias Generoso, Poços de Caldas (BR); Danilo Souza Moraes, Campinas (BR); Fabio Perale de Araujo, Campinas (BR); Igor Alves Perin, Campinas (BR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/861,931

(22) Filed: Apr. 29, 2020

(65) Prior Publication Data
US 2021/0342207 A1 Nov. 4, 2021

(51) Int. Cl.
*G06F 11/00* (2006.01)
*G06F 11/07* (2006.01)
*G06F 21/31* (2013.01)

(52) U.S. Cl.
CPC ........ *G06F 11/079* (2013.01); *G06F 11/0754* (2013.01); *G06F 11/0793* (2013.01); *G06F 21/31* (2013.01)

(58) Field of Classification Search
CPC ............ G06F 11/0751; G06F 11/0793; G06F 11/079; G06F 11/0754; G06F 21/31
See application file for complete search history.

(56) References Cited

U.S. PATENT DOCUMENTS

| 3,984,637 | A | 10/1976 | Caudill |
| 6,313,749 | B1 | 11/2001 | Horne |
| 7,206,938 | B2 | 4/2007 | Bender |
| 9,262,208 | B2 | 2/2016 | Guo |
| 9,323,641 | B2 | 4/2016 | Beasley |
| 9,467,465 | B2 | 10/2016 | Hibbert |
| 9,930,102 | B1 | 3/2018 | Paulus |

(Continued)

OTHER PUBLICATIONS

Appendix 1 to the Oct. 2019 Update: Subject Matter Eligibility, p. 1-41 (Year: 2019).*

(Continued)

*Primary Examiner* — Jonathan D Gibson
(74) *Attorney, Agent, or Firm* — Erik Swanson; Matthew M. Hulihan; Heslin Rothenberg Farley & Mesiti PC (57) ABSTRACT

A method for automatically reducing computer errors is provided. The method may include in response to detecting an interactive session, dynamically extracting data associated with a user by using a keylogging component and a camera associated with the computer. The method may further include performing real-time analysis on the extracted data to determine a risk score, whereby the risk score is used to determine whether a potential risk for a computer error exists based on the extracted data associated with the user. The method may further include in response to a command being entered on the command line interface, determining a risk score associated with the entered command. The method may also include in response to determining that the risk score is at or above a threshold risk level based on the real-time analysis, preventing the entered command from being executed and taking an additional preventive computing action.

20 Claims, 6 Drawing Sheets

(56) References Cited

U.S. PATENT DOCUMENTS

| | | | |
|---|---|---|---|
| 10,091,239 B2 | 10/2018 | Ylonen | |
| 2012/0259973 A1* | 10/2012 | Windell | H04L 41/0686 709/224 |
| 2017/0078315 A1 | 3/2017 | Allen | |
| 2020/0159609 A1* | 5/2020 | Korotaev | G06F 11/0709 |
| 2020/0278915 A1* | 9/2020 | Degaonkar | G06F 11/0793 |
| 2020/0326922 A1* | 10/2020 | Ferreira | G06F 8/63 |
| 2021/0056485 A1* | 2/2021 | Raveendran | G06F 11/079 |

OTHER PUBLICATIONS

AWS, "Summary of the Amazon S3 Service Disruption in the Northern Virginia (US-EAST-1) Region", Amazon Web service, [accessed on Jan. 28, 2020], 4 pages, Retrieved from the Internet: <URL: https://aws.amazon.com/message/41926/>.

Lerner, "The Cost of Downtime", Gartner Blog Network, Jan. 16, 2014 [accessed on Jan. 28, 2020], 16 pages, Retrieved from the Internet: <URL: https://blogs.gartner.com/andrew-lerner/2014/07/16/the-cost-of-downtime/>.

Mell, et al., "The NIST Definition of Cloud Computing", National Institute of Standards and Technology, Special Publication 800-145, Sep. 2011, 7 pages.

Miller, "How to Prevent Downtime Due to Human Error", Data Center Knowledge, Aug. 13, 2020 [accessed on Jan. 28, 2020], 4 pages, Retrieved from the Internet: <URL: https://www.datacenterknowledge.com/archives/2010/08/13/how-to-prevent-downtime-due-to-human-error>.

Ponemon Institute, "Cost of Data Center Outages", Ponemon Institute Research Report [online], Jan. 2016 [accessed on Jan. 28, 2020], 21 pages, Retrieved from the Internet: <URL: https://www.vertiv.com/globalassets/documents/reports/2016-cost-of-data-center-outages-11-11_51190_1.pdf>.

* cited by examiner

COMPUTER ERROR PREVENTION AND REDUCTION

BACKGROUND

The present invention relates generally to the field of computing, and more specifically, to reducing computing errors on computer systems and applications.

Generally, computer-related incidents and downtime can be the result of various failures on the part of hardware, software, and human interactions on computers. For example, some hardware errors may be based on faulty equipment, such as faulty parts of a desktop or keyboard, while some software errors may be based on faulty coding or programming. The computer errors that result from faulty coding or programming can typically be traced to a human error on the part of human interactions with a computer system. For example, one specific type of human error in the information technology (IT) industry is that which happens at the command line interface (CLI), where a computer error may be caused by a user either typing a command with a typo or typing the wrong command altogether in the CLI. This type of error can cause significant downtime to computer service providers, and even in today's era of large-scale computing environments, such computer service providers expect their systems to constantly be available and accessible. Therefore, unplanned downtime, even for a few minutes, can cease productivity and cause direct harmful impact on computer service providers.

SUMMARY

A method for automatically reducing computer errors is provided. The method may include in response to detecting an interactive session on a command line interface associated with a computer, dynamically extracting data associated with a user by using a keylogging component and a camera associated with the computer, wherein the extracted data comprises user behavior data and user interaction data based on user interaction with the command line interface. The method may further include performing real-time analysis on the extracted data to determine a risk score, whereby the risk score is used to determine whether a potential risk for a computer error exists based on the extracted data associated with the user. The method may further include based on the performed real-time analysis and in response to a command being entered on the command line interface, determining a risk score associated with the entered command, whereby the risk score is used to dynamically determine whether to allow execution of the entered command or prevent execution of the entered command based on a risk that the command when executed may cause a computer error. The method may also include in response to determining that the risk score is at or above a threshold risk level based on the real-time analysis, preventing the entered command from being executed and taking an additional preventive computing action, wherein the additional preventive computing action is proportional to a level at which the risk score exceeds the threshold risk level.

A computer system for automatically reducing computer errors is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include in response to detecting an interactive session on a command line interface associated with a computer, dynamically extracting data associated with a user by using a keylogging component and a camera associated with the computer, wherein the extracted data comprises user behavior data and user interaction data based on user interaction with the command line interface. The method may further include performing real-time analysis on the extracted data to determine a risk score, whereby the risk score is used to determine whether a potential risk for a computer error exists based on the extracted data associated with the user. The method may further include based on the performed real-time analysis and in response to a command being entered on the command line interface, determining a risk score associated with the entered command, whereby the risk score is used to dynamically determine whether to allow execution of the entered command or prevent execution of the entered command based on a risk that the command when executed may cause a computer error. The method may also include in response to determining that the risk score is at or above a threshold risk level based on the real-time analysis, preventing the entered command from being executed and taking an additional preventive computing action, wherein the additional preventive computing action is proportional to a level at which the risk score exceeds the threshold risk level.

A computer program product for automatically reducing computer errors is provided. The computer program product may include one or more computer-readable storage devices and program instructions stored on at least one of the one or more tangible storage devices, the program instructions executable by a processor. The computer program product may include program instructions to, in response to detecting an interactive session on a command line interface associated with a computer, dynamically extract data associated with a user by using a keylogging component and a camera associated with the computer, wherein the extracted data comprises user behavior data and user interaction data based on user interaction with the command line interface. The computer program product may also include program instructions to perform real-time analysis on the extracted data to determine a risk score, whereby the risk score is used to determine whether a potential risk for a computer error exists based on the extracted data associated with the user. The computer program product may further include program instructions to, based on the performed real-time analysis and in response to a command being entered on the command line interface, determine a risk score associated with the entered command, whereby the risk score is used to dynamically determine whether to allow execution of the entered command or prevent execution of the entered command based on a risk that the command when executed may cause a computer error. The computer program product may also include program instructions to, in response to determining that the risk score is at or above a threshold risk level based on the real-time analysis, prevent the entered command from being executed and taking an additional preventive computing action, wherein the additional preventive computing action is proportional to a level at which the risk score exceeds the threshold risk level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically reducing computer errors. The following described exemplary embodiments provide a system, method and program product for automatically preventing/reducing computer errors on computer systems, and more specifically, prevent users from making computer errors on computer systems by extracting data associated with a user to determine the probability that the user will commit an error and/or that a computer error may occur based on potential execution of a command during a computer session. Specifically, the present embodiment has the capacity to improve the technical field associated with computer error prevention by extracting data based on user behavioral patterns and other interactions associated with the user which may be analyzed in real-time to determine a risk score for committing a computer error. Furthermore, in the event that the calculated risk score exceeds a configurable threshold, the method, computer system, and computer program product may take preventive action such as sending a warning message or locking the user out of the computer session.

As previously described with respect to errors on computer systems, one prevailing type of error in the information technology (IT) industry is that which is caused by a user either typing a command with a typo or typing the wrong command altogether on a command line interface (CLI). This type of error can cause significant downtime to large service providers. An example of such a computer error can be attributed to Amazon.com® (Amazon.com and all Amazon.com-based trademarks and logos are trademarks or registered trademarks of Amazon.com and/or its affiliates). Specifically, in an Amazon.com incident, a typo in a command line caused sites and services reliant on Amazon Web Services (AWS) to be down as an engineer trying to fix billing issues removed far more servers than intended with the errant command. The reasons behind such human errors can vary but may usually include lack of skills, stressful situations, overworked staff, lack of motivation or a combination of one or more of these conditions. Efforts to prevent human errors can also vary and may typically focus on education efforts, improving employee engagement level, and enforcing processes such as change and incident management. However, due to the nature of human error, these efforts can be ineffective as even trained professionals may still commit errors. Furthermore, no current system warns or prevents a user from mistyping a command or warns the user of a command that is too generic or possibly being typed in the wrong place or with the wrong parameters. It should be appreciated that a user or operator, as these terms are used herein, may be a systems administrator or a database administrator in some embodiments.

As such, it may be advantageous, among other things, to provide a method, computer system, and computer program product for automatically reducing computer errors on computer systems. Specifically, the method, computer system, and computer program product may extract and use several input parameters associated with a user and a computer to determine the probability that the user will commit an error during a computer session. More specifically, the extracted input parameters may be based on user behavioral patterns and other factors associated with the user and may be analyzed in real-time to determine a risk level for committing a computer error. In the event the calculated risk score exceeds a configurable threshold, the method, computer system, and computer program product may take preventive action such as sending a warning message or locking the user out of the computer session.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
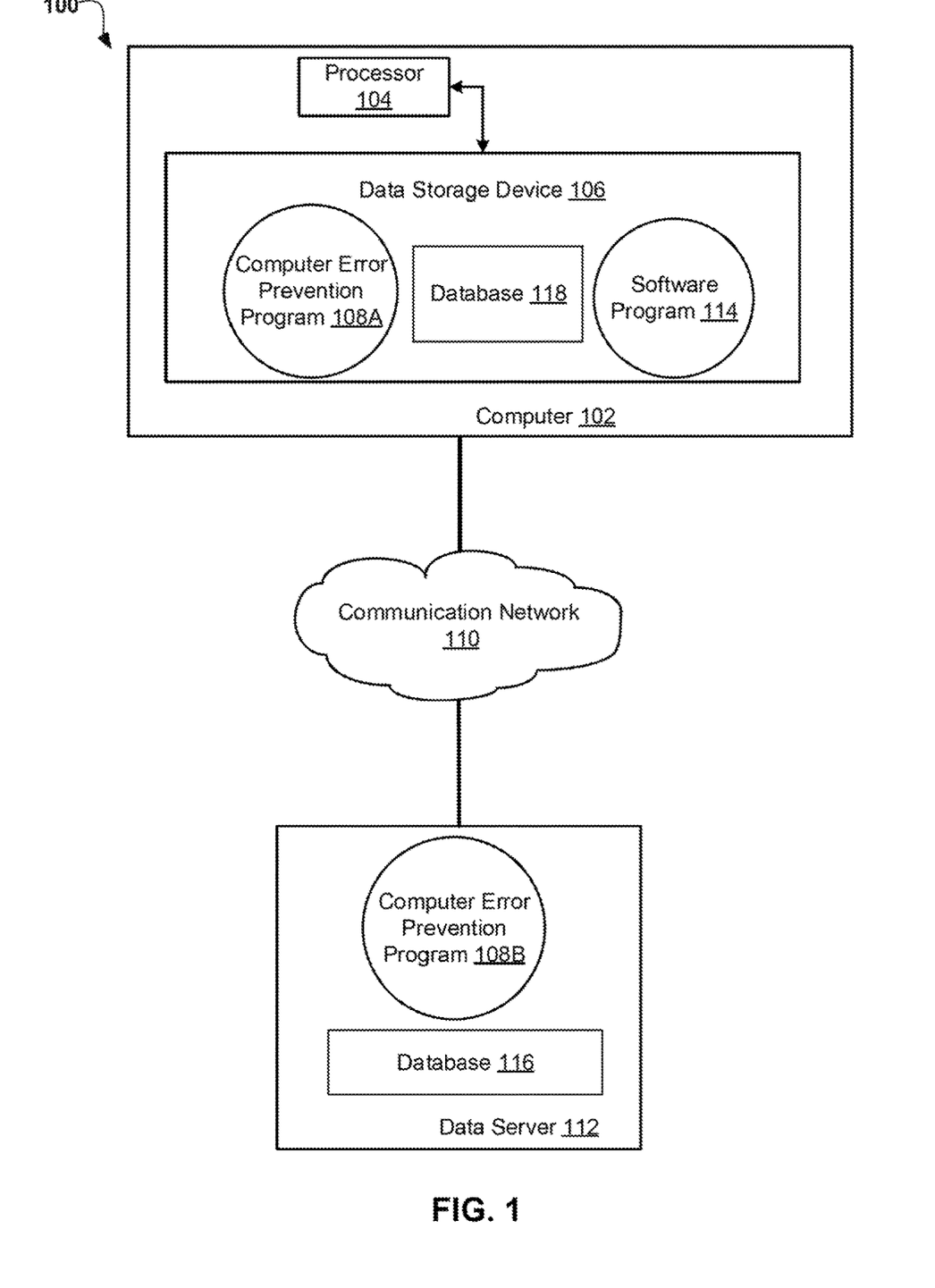
FIG. 1 illustrates a networked computer environment according to one embodiment.

Referring now to FIG. 1, an exemplary networked computer environment 100 in accordance with one embodiment is depicted. The networked computer environment 100 may include one or more computers 102 with a processor 104 and a data storage device 106 that is enabled to run a computer error prevention program 108A and a software program 114. The software program 114 may be a software program such as a system program and/or a web application program. The computer error prevention program 108A may collect data from the computer 102, including hardware data and software data from the software program 114 and its dependent programs, as well as collect usage associated with a user of the computer 102. The networked computer environment 100 may also include one or more servers 112 that is enabled to run a computer error prevention program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computers 102 may be, for example, desktop computers, or any type of computing system or devices capable of running programs and accessing a network and remote programs, and may be a part of a large computing system, or a cloud computing platform. According to various implementations of the present embodiment, the computer error prevention program 108A, 108B may interact with a database 116 that may be embedded in various storage devices, such as, but not limited to a client computing system 102, a networked server 112, or a cloud storage service.

According to the present embodiment, a program, such as a computer error prevention program 108A and 108B may run on the client computer 102 or on the server computer 112 via a communications network 110. The computer error prevention program 108A, 108B may automatically prevent/reduce computer errors on computer systems, and more specifically, prevent users from making computer errors on computer systems. Specifically, the computer error prevention program 108A, 108B, may run on one or more client computers 102 and/or servers 112 and may extract data associated with a computer 102 and/or server 112 as well as data associated with a user to determine the probability that the user will commit an error during a computer session on the client computer 102. More specifically, the computer error prevention program 108A, 108B may use the extracted data, which may be based on user behavior and interactions on a computer and other user-related factors, as input that may be analyzed by the computer error prevention program 108A, 108B in real-time to determine a risk level that the user may commit a computer error. In the event the calculated risk level exceeds a configurable threshold, the computer error prevention program 108A, 108B may take preventive action such as sending a warning message or locking the user out of the computer session.

Figure 2:
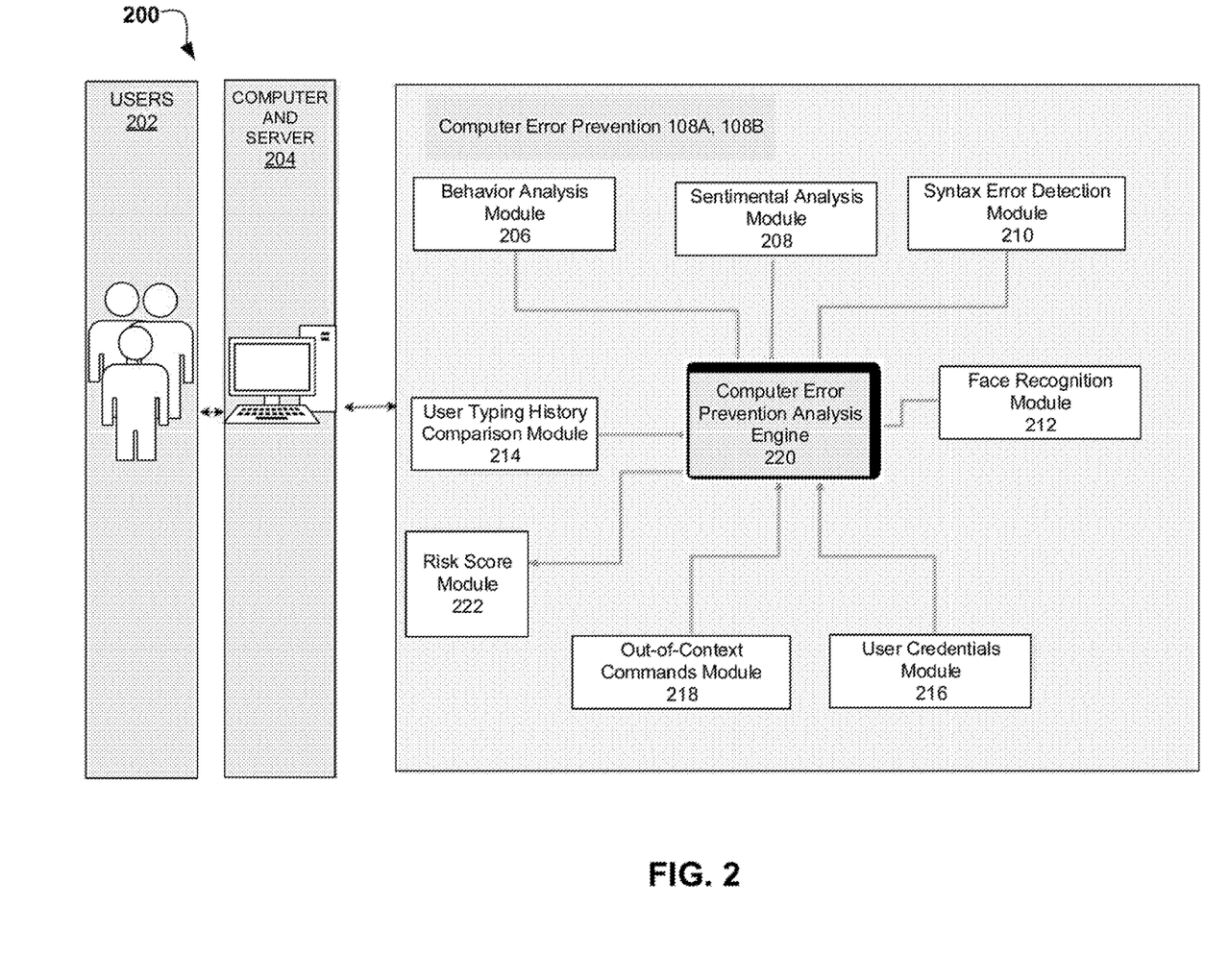
FIG. 2 is a block diagram illustrating the system components of a program for automatically reducing computer errors according to one embodiment.

Referring now to FIG. 2, a block diagram illustrating the system components of a computer error prevention program 108A, 108B according to one embodiment is depicted. As previously described, the computer error prevention program 108A, 108B may extract data associated with a user 202 and a computer 204 to determine the probability of an error occurring on a computer. Specifically, according to one embodiment, for a given user 202 performing work on a computer system 204, the computer error prevention program 108A, 108B may detect patterns of behavior associated with the user 202, measure and weigh the patterns of behavior with other factors, and together use that data to calculate a risk score that represents a potential risk that an error may occur for that specific working session.

For example, the computer error prevention program 108A, 108B may detect that a user 202 is engaged in an interactive session with a command line interface on a computer system 204, which may include the client computer 102 and/or the server 112 (FIG. 1). Furthermore, the computer error prevention program 108A, 108B may also detect that the user 202 may be attempting to type in a command using the command line interface associated with the computer system 204 to, for example, install new software, update or configure existing software, troubleshoot and fix an existing issue on the computer/server, and/or give a specific order to an operating system or application. As such, the computer error prevention program 108A, 108B may dynamically extract data associated with the user 202, for example, by dynamically extracting data associated with the user 202 while the user 202 is logged into the computer system 204 and/or while the user 202 is logged into and/or engaging with the interactive session with the command line interface. For example, the computer error prevention program 108A, 108B may include a local component and/or computer programming, such as keylogging hardware and/or keylogging software, on the computer system 204 to detect and log user keystrokes, whereby the local component and programming may only be active when instructed by the computer error prevention program 108A, 108B (for example, during a working session started by a user). Additionally, the computer error prevention program 108A, 108B may perform real-time analysis on the extracted data to determine whether to allow the command or prevent a command from being executed.

According to one embodiment, the computer error prevention program 108A, 108B may also store the extracted data and the analysis of each user on a database, such as database 116, 118 (FIG. 1), and thereby generate a profile for each user based on the stored data to use in future analyses by the computer error prevention program 108A, 108B. Specifically, the computer error prevention program 108A, 108B may use machine learning techniques to create and update user profile information. For example, and as will be described with reference to FIG. 2, the computer error prevention program 108A, 108B may apply machine learning techniques to a user's typing history, whereby the computer error prevention program 108A, 108B can learn the user's typing pattern to determine a baseline typing pattern for the user 202 to in turn detect deviations from the user's baseline typing pattern. Furthermore, according to one embodiment, the computer error prevention program 108A, 108B may uniquely identify different users 202 based on their login credentials (username and password) as well as on face recognition. Subsequently, according to one embodiment, for a first-time user 202, the computer error prevention program 108A, 108B may initially extract data to establish a profile for the user 202, such as user's credentials that may include a user's 202 official job title, level of seniority, level of security, level of access, etc. Thereafter, during the user's first session, and for subsequent sessions, the computer error prevention program 108A, 108B may extract additional data to dynamically and continuously update the generated profile using machine learning techniques, as well as detect deviations from the profile that would indicate an abnormal situation.

More specifically, and as depicted in FIG. 2, the computer error prevention program 108A, 108B may include a behavior analysis module 206, sentiment analysis module 208, syntax error detection module 210, face recognition module 212, user typing history comparison module 214, out-of-context commands module 216, and user credentials module 218 to extract and analyze data associated with the user 202. For example, the computer error prevention program 108A, 108B may include the behavior analysis module 206 and the local component/software to detect and extract erratic behavior, such as when a user enters a failing command multiple times (i.e. constantly typing and then deleting a command). This type of behavior can be an indicator of a user that is frustrated, tired or stressed, and therefore, can be at risk of committing an error on the computer system 204. Furthermore, the computer error prevention program 108A, 108B may include a sentiment analysis module 208 to further detect a user's sentiment/mood. For example, the computer error prevention program 108A, 108B may use/ leverage a local component such as a microphone and/or camera, as well as software such as IBM Watson Sentiment Analysis® (IBM Watson and all IBM-based trademarks and logos are trademarks or registered trademarks of International Business Machines Corporation and/or its affiliates) to determine whether a user's reaction indicates a positive, negative, or neutral reaction. More specifically, for the sentiment analysis, the computer error prevention program 108A, 108B may use a microphone and IBM Watson Sentiment Analysis® for voice recognition, speech-to-text conversion to detect and extract the user's 202 speech pattern and voice tone and detect deviations from speech. Concurrently, the computer error prevention program 108A, 108B may also include a face recognition module to 212 to determine user stress levels based on the user's facial expressions. For example, the computer error prevention program 108A, 108B may use a camera associated with the computer system 204 to capture camera-based image information based on facial expressions associated with the user 202 to detect possible stress and/or fatigue, sleepiness, inattentiveness, or lack of concentration or focus.

Furthermore, the computer error prevention program 108A, 108B may include a user typing history comparison module 214 to determine abnormalities in the user's 202 typing pattern based on a typing history associated with the user. Specifically, for example, and as previously described, the computer error prevention program 108A, 108B may include a local component (i.e. keylogging hardware) and/or keylogging programming to detect and capture user keystrokes and keyboard interaction information. Also, and as previously described, the computer error prevention program 108A, 108B may store the extracted data and the analysis of each user on a database, such as database 116, 118 (FIG. 1), and generate a profile for a user based on the extracted and stored data. As such, the computer error prevention program 108A, 108B may store profile information associated with a user 202 that may include typing profile information for the user 202, and may compare a current typing pattern against a determined and stored baseline typing pattern for the user 202 based on the user's typing history. In turn, the computer error prevention program 108A, 108B may use deviations from the baseline typing pattern, if any, as another input parameter that is incorporated in the extracted data that is analyzed.

Additionally, the computer error prevention program 108A, 108B may include a user credentials module 216 to detect user credentials associated with the user 202. For example, the computer error prevention program 108A, 108B may detect user credentials such as a user's 202 official job title, level of seniority, level of security, and level of access. As such, the computer error prevention program 108A, 108B may use the user's credentials to determine whether a user has certain permissions and/or has authorized access to perform/execute certain commands. Additionally, the computer error prevention program 108A, 108B may include an out-of-context commands module 218 to, for example, detect commands that are being typed in by the user but may not be intended for a certain targeted system, may not be intended for the specific operation that the user is trying to execute, and/or may not be within the user's credentials (for example, commands that are above the user's level of access).

Thereafter, and as previously described, the computer error prevention program 108A, 108B may perform real-time analysis on the extracted data from each of the modules to determine whether to allow the typed-in command by the user 202 or prevent the typed-in command from being executed upon the user 202 entering the command (for example, upon the user pressing an "ENTER" key). Specifically, the computer error prevention program 108A, 108B may include a computer error prevention analysis engine 220 to analyze the different types of extracted data inputted from each of the modules and to calculate a risk score 222. According to one embodiment, each of the different types of data may incrementally increase the overall risk score to indicate that a user is committing and/or will commit an error with the typed-in command. Also, according to one embodiment, and as will be described with reference to FIG. 3, the computer error prevention program 108A, 108B may assign different weights to the different types of extracted data, whereby assigning the different weights may be configurable by, for example, an administrator. In turn, in response to the risk score 222 exceeding a configurable threshold, the computer error prevention program 108A, 108B may take preventive action such as sending a warning message or locking the user 202 out of a session. Furthermore, according to one embodiment, the determined preventive action taken by the computer error prevention program 108A, 108B may also depend on the level at which the risk score 222 exceeds the configurable threshold.

Figure 3:
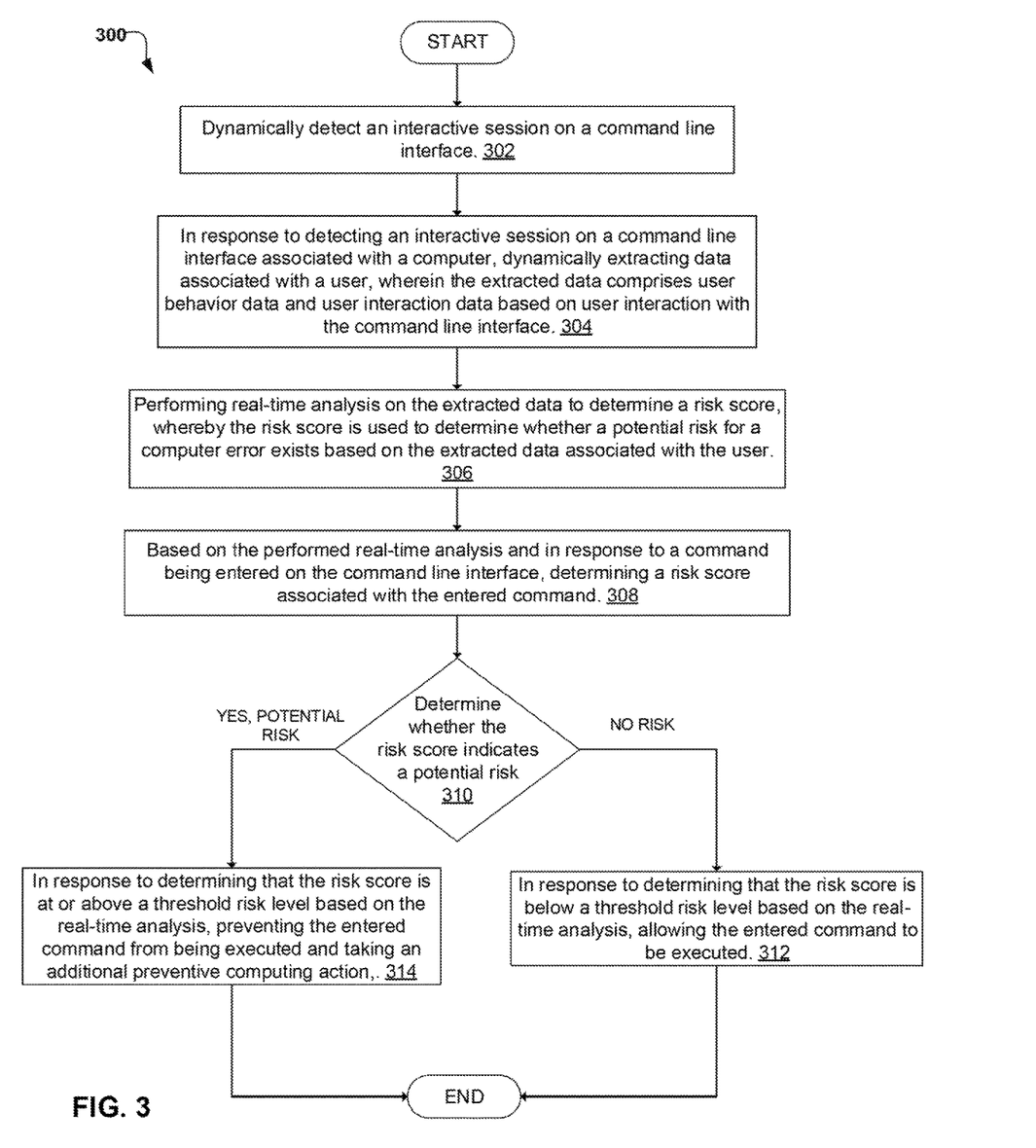
FIG. 3 is an operational flowchart illustrating the steps carried out by a program for automatically reducing computer errors according to one embodiment.

Referring now to FIG. 3, an operational flowchart 300 illustrating the steps carried out by a program for automatically reducing computer errors on computer systems according to one embodiment is depicted. Specifically, at step 302, the computer error prevention program 108A, 108B may dynamically detect an interactive session on a command line interface. Specifically, and as previously described, the computer error prevention program 108A, 108B may detect that a user is accessing or is logged into a computer system, which may include the client computer 102 and/or the server 112 (FIG. 1), and that the user starts a session with a command line interface to, for example, install new software, update or configure existing software, troubleshoot and fix an existing issue on the computer/server, and/or give a specific order to an operating system or application. For example, the computer error prevention program 108A, 108B may detect that the user 202 is typing in a command in the command line interface, whereby the command may include one or more lines of text for an operation associated with a computer system or program. For example, the computer error prevention program 108A, 108B may implement a command-line interface for interactive access to operating system functions or services to allow a user to enter commands to edit and/or update such functions and services. As such, the computer error prevention program 108A, 108B may detect that the user 202 is typing in a command by detecting that the user is typing text in a command line interface.

Next, at 304, in response to detecting the interactive session on the command line interface, the computer error prevention program 108A, 108B may dynamically extract data associated with the user 202, whereby the extracted data may include user behavior data and user interaction data based on the user's interaction with the command line interface. As previously described with respect to FIG. 2, the computer error prevention program 108A, 108B may dynamically extract data associated with the user 202 while the user 202 is logged into the computer system 204 and/or while the user 202 is specifically logged into and/or engaged with the interactive session on the command line interface. Furthermore, according to one embodiment, the computer error prevention program 108A, 108B may prioritize, and/or be configured to prioritize, extracting certain types of data over other types and/or may be configured to extract certain types of data but not extract other types of data. For example, based on a configuration, the computer error prevention program 108A, 108B may extract user credentials upon the user logging into or accessing a command line interface and may extract the user's keystrokes (i.e. extract the text typed in by the user), but may not use the camera and the face recognition module 212 to extract the user's facial expressions. Also, according to one embodiment, for certain features such as face recognition, the computer error prevention program 108A, 108B may include privacy settings that would enable users to explicitly provide or deny their consent to their image being recorded and analyzed. Furthermore, as the computer error prevention program 108A, 108B extracts data associated with the user, the computer error prevention program 108A, 108B may also use the extracted data to create a user profile. As previously described, the computer error prevention program 108A, 108B may use machine learning techniques to create and update a user profile that is specific to each user and that includes information based on the extracted data. For example, and as described in FIG. 2, the computer error prevention program 108A, 108B may apply machine learning techniques to determine a user's typing pattern, whereby the computer error prevention program 108A, 108B can learn the user's typing pattern to determine a baseline typing pattern for the user 202 and store such information on a user profile associated with that specific user. Also, for example, the computer error prevention program 108A, 108B may also extract a user's facial expressions and store that information on a user profile along with other extracted data.

Then, at 306, the computer error prevention program 108A, 108B may perform real-time analysis on the extracted data to determine a risk score, whereby the risk score may determine whether a potential risk for a computer error exists based on the extracted data associated with the user.

As previously described, the computer error prevention program 108A, 108B may include a behavior analysis module 206, sentiment analysis module 208, syntax error detection module 210, face recognition module 212, user typing history comparison module 214, out-of-context commands module 216, and user credentials module 218 to extract and analyze data associated with the user 202. Specifically, and as previously described with respect to the computer error prevention program 108A, 108B, different types of data may be extracted and analyzed by a respective module and then fed into the computer error prevention analysis engine 220 as input to determine a risk score 222. For example, and as previously described in FIG. 2, the computer error prevention program 108A, 108B may use the behavior analysis module 206 to detect erratic behavior, such as when a user enters a failing command multiple times (i.e. constantly typing and then deleting a command). Furthermore, for example, the computer error prevention program 108A, 108B may use the sentiment analysis module 208 to further detect a user's sentiment/mood to determine whether a user's reaction indicates a positive, negative, or neutral reaction. The computer error prevention program 108A, 108B may also use the face recognition module to 212 to determine user stress levels by detecting a user's facial expressions using a camera. Furthermore, the computer error prevention program 108A, 108B may include a user typing history comparison module 214 to determine abnormalities in the user's 202 typing pattern based on a typing history associated with the user that is captured by a keylogging device/component and/or keylogging software that may be included in the computer error prevention program 108A, 108B.

Additionally, according to one embodiment, the computer error prevention program 108A, 108B may distinguish between online extraction and analysis versus offline extraction and analysis. Specifically, for example, based on computer issues, and/or internal and external connectivity issues, the computer error prevention program 108A, 108B may elect to perform offline extraction and analysis, whereby the offline extraction and analysis may not include the extraction and analysis that requires connectivity to a component or software in order to be performed. As such, the offline extraction and analysis may result in a less than full analysis by the computer error prevention program 108A, 108B (i.e. does not include all of the analysis that the computer error prevention program 108A, 108B may be capable of). Conversely, online extraction and analysis may include full extraction and analysis by the computer error prevention program 108A, 108B where computer issues and connectivity may not be an issue (i.e. there are little to no computer and connectivity issues). For example, based on connectivity issues such as network latency or slow response times, the computer error prevention program 108A, 108B may perform offline analysis so as not to compromise potential response times to the interactive commands that are entered by the user on the command line interface. As an example, the analyses that may be performed during online extraction and analysis may include the sentiment analysis, based on connectivity to IBM Watson Sentiment Analysis® including speech-to-text conversion, as well as the face recognition analysis, based on connectivity to a camera for capturing mood and facial expressions. Based on computer issues such as network latency and slow response times, the computer error prevention program 108A, 108B may elect to perform offline extraction and analysis where sentiment analysis and face recognition analysis may not be performed due to the slow response times but the other different types of analysis may be performed.

According to one embodiment, the difference between online extraction and analysis versus offline extraction and analysis may be fluid. For example, for a large computing environment or organization, it might be more feasible to leverage advanced computing systems and services where network latency may not be an issue, however, this might not be practical or affordable for other smaller computer environments and individuals. Furthermore, as network latency may be one cause for the computer error prevention program 108A, 108B to avoid online extraction and analysis, a specific value may also be configured on the computer error prevention program 108A, 108B to further provide a rule and/or guidance on determining whether to perform online extraction and analysis versus offline extraction and analysis. For example, a configuration rule may include: if network response times are more than 100 milliseconds, then the computer error prevention program 108A, 108B may avoid online extraction and analysis and may perform offline extraction and analysis instead, where sentiment analysis and face recognition analysis may not be performed. The configuration rule including the 100 milliseconds value is an example and could be a user-configurable parameter, as different users might have different expectations on what is an acceptable delay in response times. According to one embodiment, the computer error prevention program 108A, 108B may provide an administrator/user with an interface to generate configuration rules as well as to provide the administrator with an option to choose which analyses to perform. However, the more analysis that the computer error prevention program 108A, 108B performs to calculate the risk level, the greater the accuracy may be for detecting the risk of an error.

Next, at 308, based on the performed analysis and in response to a command being entered by a user, the computer error prevention program 108A, 108B may determine a risk score associated with the user and the entered command, whereby the risk score may be used to determine whether to allow the entered command or prevent the entered command from being executed based on a risk that the command, if executed, may cause an error. Specifically, and as previously described, the computer error prevention program 108A, 108B may perform real-time analysis on the extracted data to determine whether to allow a typed-in command or prevent a typed-in command from being executed in response to the user 202 entering the command. More specifically, according to one embodiment, in response to the user pressing an "ENTER" key in an attempt to initiate a command that the user has typed into the command line interface, the computer error prevention program 108A, 108B may use the computer error prevention analysis engine 220 to calculate a risk score for determining whether to allow execution of the command. For example, the computer error prevention program 108A, 108B may calculate a risk score by adding up scores from each of the different types of extracted and analyzed data. For example, each of the different analysis modules may return an integer value starting at "0" and may increase in proportion to a perceived risk. Specifically, an overall initial risk score for a given session may be 0 (zero). However, the computer error prevention program 108A, 108B may detect high rate of typing errors and corrected mistakes, and in turn, may increase the risk score to 1 or 2. Specifically, if the computer error prevention program 108A, 108B detects a deviation against the normal typing habits for a user, the risk score may be further increased by a value proportional to the deviation level detected. Also, for example, a command deemed inherently dangerous, out of context, out of role for the user, among other factors, may further increase the calculated risk score.

Also, according to one embodiment, the computer error prevention analysis engine 220 may multiply the values by a weight factor, whereby the weight factor may represent a weight that is given to a specific type of extracted and analyzed data, and whereby the weight factor may be different for the different types of extracted and analyzed data. The computer error prevention analysis engine 220 may multiply the returned values from the different types of extracted and analyzed data by a weight factor and then add the resulting numbers together to obtain a final risk score. For example, the computer error prevention program 108A, 108B may use machining learning techniques to establish a weight factor for each of the different types of data and/or enable an administrator to specify/configure a weight to be given to the different types of extracted data. Specifically, for example, the computer error prevention program 108A, 108B may determine that a copy and paste command for an operating system might be considered dangerous on a given computing environment, and thus may assign a higher weight to the type of command that would be executed than, for example, the weight given to the rate of typing errors that the user performs during a given session.

In turn, at 310, the computer error prevention program 108A, 108B may determine whether an entered command includes a potential risk of causing an error on a computing system and/or program based on the calculated risk score reaching a certain risk level, which may be a configurable threshold. For example, and as previously described, the computer error prevention program 108A, 108B may calculate a risk score by adding up scores from each of the different types of extracted and analyzed data. For example, each of the different analysis modules may return an integer value starting at "0" and may increase in proportion to a perceived risk For example, the computer error prevention program 108A, 108B may determine, or be configured, such that a calculated risk score may range between 1 and 10, and that a risk level of 5 and above is enough to designate a command as a potential risk. Thus, for example, based on detected deviations against a user's normal typing habits, syntax errors detected in the entered command, and a command that may be deemed out of context for the specific operation that the user is attempting to perform, computer error prevention program 108A, 108B may increase the risk score by a value proportional to the deviation levels detected such the risk score may rise above the risk level of 5.

At 312, in response to the computer error prevention program 108A, 108B determining that the calculated risk score is below a threshold risk level, and therefore, that the entered command is not a potential risk for causing a computer and/or computer programming error, the computer error prevention program 108A, 108B may execute the command and take no further action.

However, at 314, in response to the computer error prevention program 108A, 108B determining that the calculated risk score is at or above a threshold risk level, and therefore, that the entered command represents a potential risk based on the risk score, the computer error prevention program 108A, 108B may prevent the entered command from being executed and may take additional preventive computer action. According to one embodiment, the additional preventive computer action taken by the computer error prevention program 108A, 108B may be proportional to the calculated risk score, or the level at which the risk score exceeds the threshold risk level. Specifically, and continuing from the previous example described at 310, the computer error prevention program 108A, 108B may include certain rules and take certain actions when different threshold risk levels are reached, such as: for risk level 5—display a warning message within the user's session advising to seek assistance, for risk level 7—interact with computer monitoring systems associated with a computing environment that includes the user's computing system to create an incident report that may be displayed on at least one of the computer monitoring systems to get the attention of other users/operators, for risk level 9—terminate the user's session and display an explanatory message that explains why the command is deemed risky, such as displaying the risk score and the factors that contributed to the risk score.

It may be appreciated that FIGS. 1-3 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
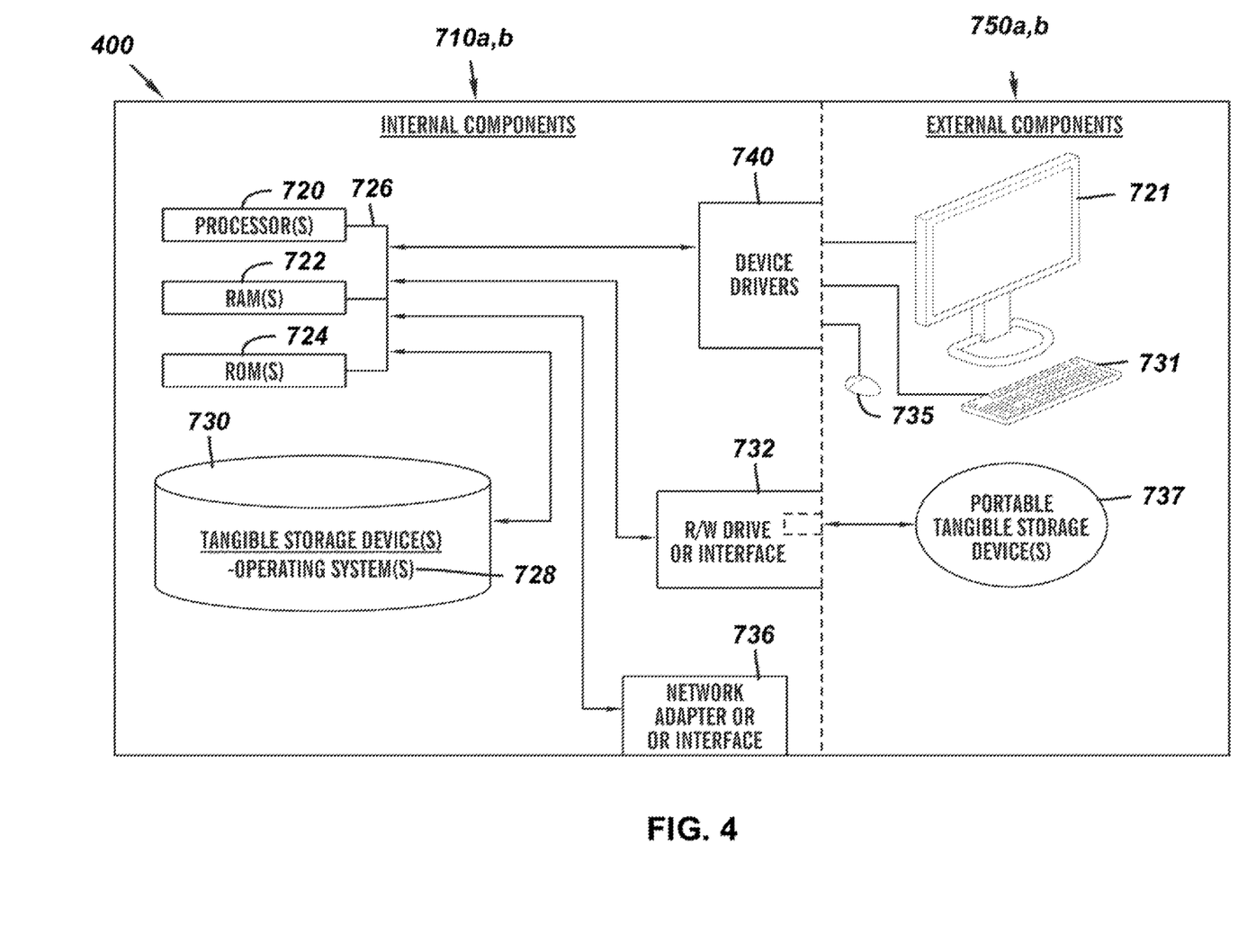
FIG. 4 is a block diagram of the system architecture of the program for automatically reducing computer errors according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 4. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the computer error prevention program 108A (FIG. 1) in client computer 102 (FIG. 1), and the computer error prevention program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 4, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as a computer error prevention program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The computer error prevention program 108A (FIG. 1) and software program 114 (FIG. 1) in client computer 102 (FIG. 1), and the computer error prevention program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the computer error prevention program 108A (FIG. 1) and software program 114 (FIG. 1) in client computer 102 (FIG. 1) and the computer error prevention program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
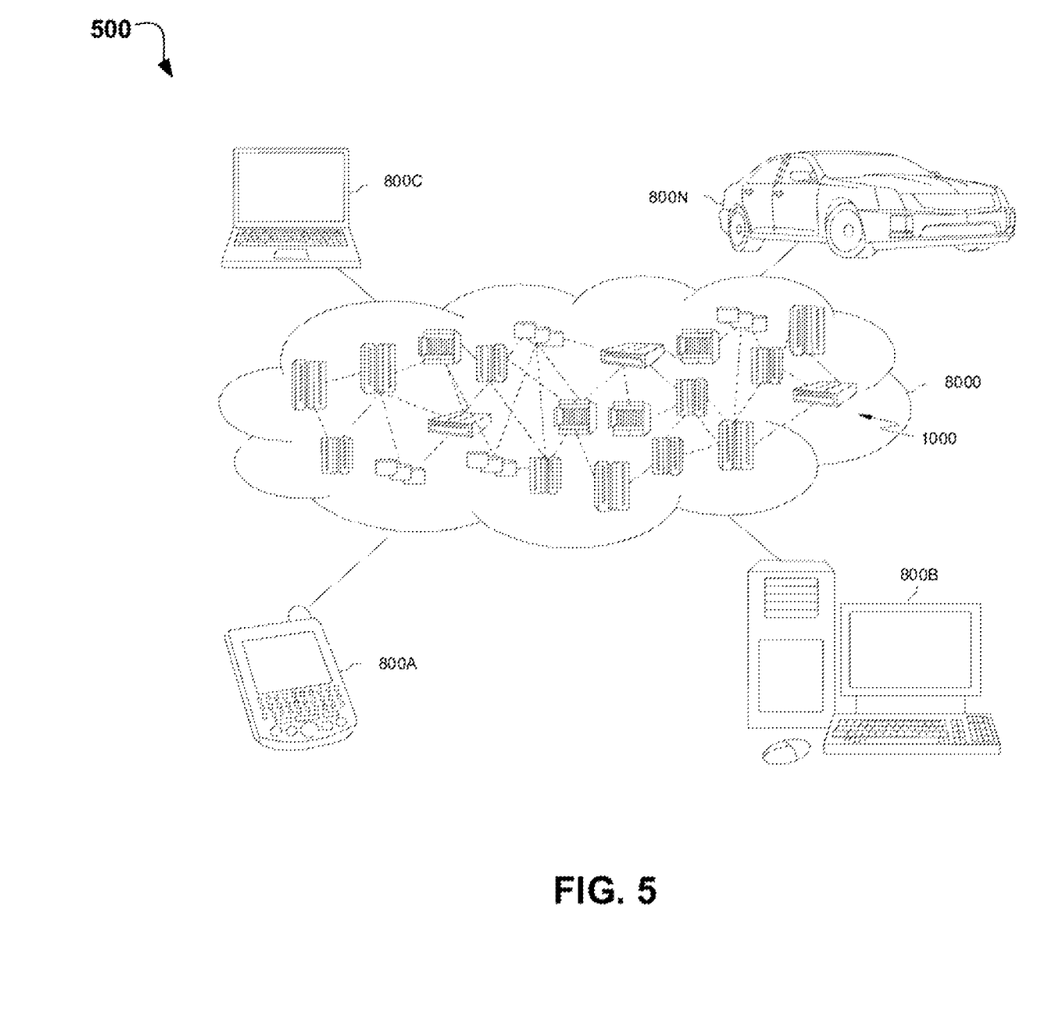
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 6 are intended to be illustrative only and that computing nodes 100 and cloud computing environment 8000 can communicate with any type of computerized device over any type of network and/or network addressable connection (e.g., using a web browser).

Figure 6:
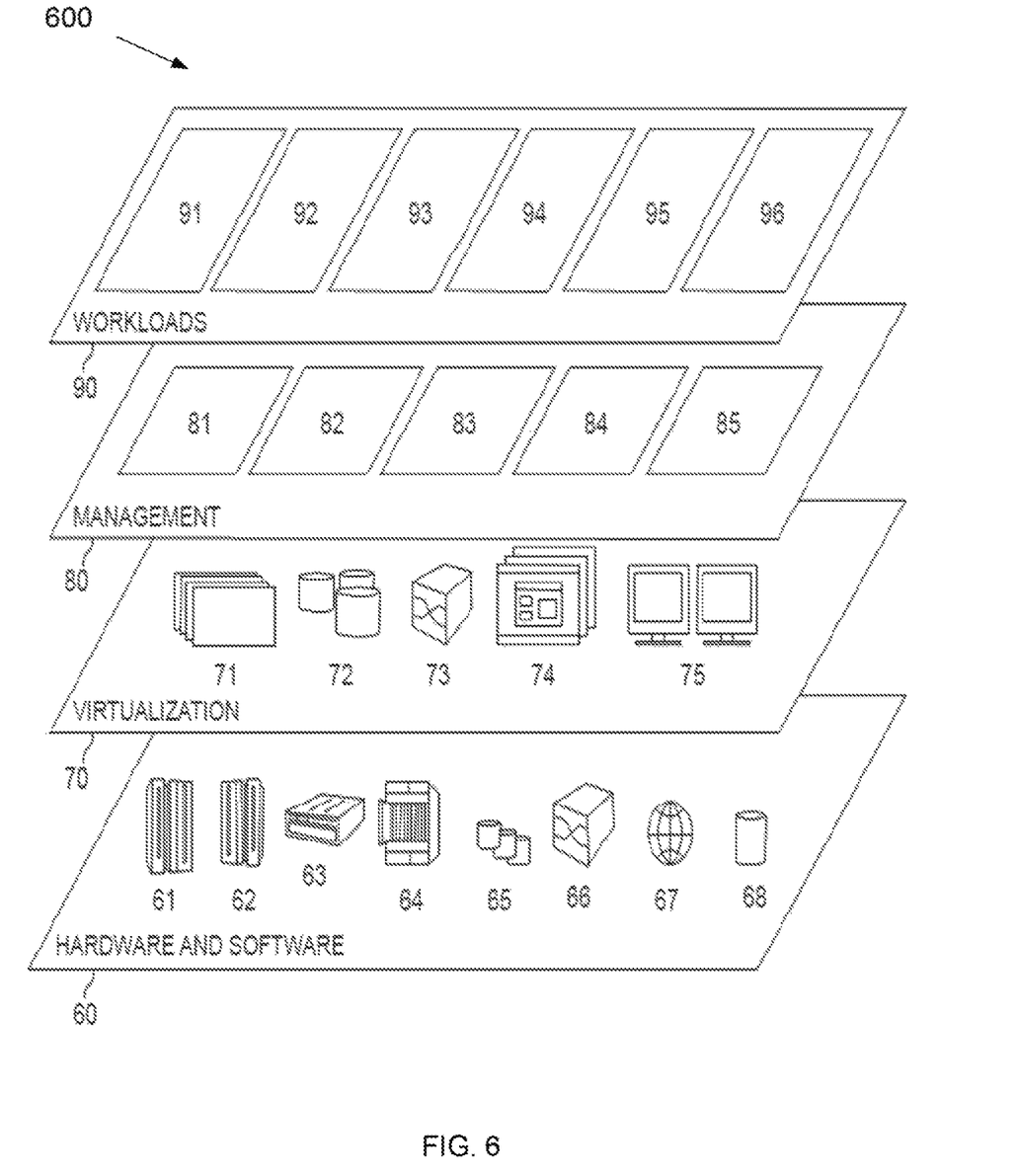
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 800 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer error prevention 96. A computer error prevention program 108A, 108B (FIG. 1) may be offered "as a service in the cloud" (i.e., Software as a Service (SaaS)) for applications running on computing devices 102 (FIG. 1) and may automatically reduce computer errors.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically reducing computer errors, the method comprising:
    in response to detecting an interactive session on a command line interface associated with a computer, dynamically extracting, by the computer, data associated with a user by using a keylogging component and a camera associated with the computer, wherein the extracted data comprises user behavior data and user interaction data based on user interaction with the command line interface;
    receiving, from a keyboard with which the user interacts to provide keystroke data to the computer, a command entered on the command line interface by the user;
    based on performed real-time analysis on the extracted data and based on receiving the command, determining, by the computer, a risk score associated with the entered command, whereby the risk score is used to dynamically determine whether to allow execution of the entered command or prevent execution of the entered command based on a risk that the entered command when executed causes a computer error; and
    in response to initiation of the entered command and determining that the risk score is at or above a threshold risk level based on the real-time analysis, automatically preventing, by the computer, the entered command from being executed and taking an additional preventive computing action, wherein the additional preventive computing action is proportional to a determined level at which the risk score exceeds the threshold risk level.

2. The method of claim 1, wherein the extracted data is selected from a group comprising user sentiment data, syntax error detection data, face recognition data, user typing history and pattern data, out-of-context command data, and user credentials data.

3. The method of claim 1, further comprising:
    generating, by the computer, a user profile for the user based on the extracted data, wherein the user profile is used to detect deviations from the user behavior data and the user interaction data.

4. The method of claim 1, wherein performing the real-time analysis on the extracted data further comprises:
    determining, by the computer, whether to perform online real-time analysis or offline real-time analysis based on computer connectivity issues and response time.

5. The method of claim 1, wherein determining, by the computer, the risk score associated with the entered command further comprises:
    assigning a different weighted value to different types of data associated with the extracted data.

6. The method of claim 1, wherein the entered command performs an operation that is selected from a group comprising installing new software, updating or configuring existing software, troubleshooting and fixing an existing issue on the computer, and giving a specific order to an operating system or application.

7. The method of claim 1, wherein the additional preventive computer action is selected from a group comprising displaying a warning message on the computer and advising the user to seek assistance, interacting with computer monitoring systems associated with a computing environment that includes the computer to generate and display an incident report on at least one of the computer monitoring systems to get the attention of other users, terminating a computer session associated with the user and displaying an explanatory message that explains why the entered command is determined to be the risk.

8. A computer system for automatically reducing computer errors, comprising:
    one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:
    in response to detecting an interactive session on a command line interface associated with a computer, dynamically extracting data associated with a user by using a keylogging component and a camera associated with the computer, wherein the extracted data comprises user behavior data and user interaction data based on user interaction with the command line interface;
    receiving, from a keyboard with which the user interacts to provide keystroke data to the computer, a command entered on the command line interface by the user;
    based on performed real-time analysis on the extracted data and based on receiving the command, determining a risk score associated with the entered command, whereby the risk score is used to dynamically determine whether to allow execution of the entered command or prevent execution of the entered command based on a risk that the entered command when executed causes a computer error; and
    in response to initiation of the entered command and determining that the risk score is at or above a threshold risk level based on the real-time analysis, automatically preventing the entered command from being executed and taking an additional preventive computing action, wherein the additional preventive computing action is proportional to a determined level at which the risk score exceeds the threshold risk level.

9. The computer system of claim 8, wherein the extracted data is selected from a group comprising user sentiment data, syntax error detection data, face recognition data, user typing history and pattern data, out-of-context command data, and user credentials data.

10. The computer system of claim 8, further comprising:
    generating a user profile for the user based on the extracted data, wherein the user profile is used to detect deviations from the user behavior data and the user interaction data.

11. The computer system of claim 8, wherein performing the real-time analysis on the extracted data further comprises:
    determining whether to perform online real-time analysis or offline real-time analysis based on computer connectivity issues and response time.

12. The computer system of claim 8, wherein determining the risk score associated with the entered command further comprises:
    assigning a different weighted value to different types of data associated with the extracted data.

13. The computer system of claim 8, wherein the entered command performs an operation that is selected from a group comprising installing new software, updating or configuring existing software, troubleshooting and fixing an existing issue on the computer, and giving a specific order to an operating system or application.

14. The computer system of claim 8, wherein the additional preventive computer action is selected from a group comprising displaying a warning message on the computer and advising the user to seek assistance, interacting with computer monitoring systems associated with a computing environment that includes the computer to generate and display an incident report on at least one of the computer monitoring systems to get the attention of other users, terminating a computer session associated with the user and displaying an explanatory message that explains why the entered command is determined to be the risk.

15. A computer program product for automatically reducing computer errors, comprising:
   one or more tangible computer-readable storage devices and program instructions stored on at least one of the one or more tangible computer-readable storage devices, the program instructions executable by a processor, the program instructions comprising:
   program instructions to, in response to detecting an interactive session on a command line interface associated with a computer, dynamically extract data associated with a user by using a keylogging component and a camera associated with the computer, wherein the extracted data comprises user behavior data and user interaction data based on user interaction with the command line interface;
   program instructions receive, from a keyboard with which the user interacts to provide keystroke data to the computer, a commend entered on the command line interface by the user;
   program instructions to, based on performed real-time analysis on the extracted data and based on the receipt of the command, determine a risk score associated with the entered command, whereby the risk score is used to dynamically determine whether to allow execution of the entered command or prevent execution of the entered command based on a risk that the entered command when executed causes a computer error; and
   program instructions to, in response to initiation of the entered command and determining that the risk score is at or above a threshold risk level based on the real-time analysis, automatically prevent the entered command from being executed and taking an additional preventive computing action, wherein the additional preventive computing action is proportional to a determined level at which the risk score exceeds the threshold risk level.

16. The computer program product of claim 15, wherein the extracted data is selected from a group comprising user sentiment data, syntax error detection data, face recognition data, user typing history and pattern data, out-of-context command data, and user credentials data.

17. The computer program product of claim 15, further comprising:
   program instructions to generate a user profile for the user based on the extracted data, wherein the user profile is used to detect deviations from the user behavior data and the user interaction data.

18. The computer program product of claim 15, wherein the program instructions to perform the real-time analysis on the extracted data further comprises:
   program instructions to determine whether to perform online real-time analysis or offline real-time analysis based on computer connectivity issues and response time.

19. The computer program product of claim 15, wherein the program instructions to determine the risk score associated with the entered command further comprises:
   program instructions to assign a different weighted value to different types of data associated with the extracted data.

20. The method of claim 15, wherein the additional preventive computer action is selected from a group comprising displaying a warning message on the computer and advising the user to seek assistance, interacting with computer monitoring systems associated with a computing environment that includes the computer to generate and display an incident report on at least one of the computer monitoring systems to get the attention of other users, terminating a computer session associated with the user and displaying an explanatory message that explains why the entered command is determined to be the risk.

* * * * *